United States Patent [19]

Whillock et al.

[11] 3,972,467
[45] Aug. 3, 1976

[54] PAPER-BOARD LAMINATE

[75] Inventors: Allan A. Whillock, Mobile, Ala.; James Wesley Yount, Terre Haute, Ind.

[73] Assignee: International Paper Company, New York, N.Y.

[22] Filed: Aug. 6, 1974

[21] Appl. No.: 495,253

[52] U.S. Cl. ............... 229/14 BL; 229/3.1; 229/3.5 R; 428/212; 428/213; 428/214; 428/215; 428/458; 428/474; 428/476; 428/461; 428/511; 428/537; 426/126

[51] Int. Cl.² ............... B65D 15/22; B32B 21/06; B32B 15/08

[58] Field of Search ........... 161/214, 165, 216, 250, 161/229, 227; 428/458, 474, 537, 476, 511, 458, 461, 212, 213, 214, 215, 334, 335, 336; 426/126; 229/87 B, 87 F, 3.5 MF, 14 BL, 3.1, 3.5 R

[56] References Cited
UNITED STATES PATENTS

| | | | |
|---|---|---|---|
| 2,750,095 | 6/1956 | Alden | 229/17 |
| 3,239,126 | 3/1966 | Arslanian | 229/3.5 MF |
| 3,365,111 | 1/1968 | McNair | 229/3.5 R |
| 3,423,231 | 1/1969 | Lutzmann | 161/227 |
| 3,514,367 | 5/1970 | James | 428/212 |
| 3,570,748 | 3/1971 | Coyle | 161/227 |
| 3,669,692 | 6/1972 | Turbak | 161/216 |
| 3,682,767 | 8/1972 | Britton | 428/474 |
| 3,697,368 | 10/1972 | Bhuta | 428/474 |
| 3,753,828 | 8/1973 | Manne | 428/474 |
| 3,791,915 | 2/1974 | Goehring | 428/474 |
| 3,836,425 | 9/1974 | Whiting | 161/214 |
| 3,840,427 | 10/1974 | Brazier | 161/227 |
| T888,001 | 7/1971 | Drake | 156/306 |

*Primary Examiner*—Marion E. McCamish
*Assistant Examiner*—Ellis P. Robinson
*Attorney, Agent, or Firm*—Ronald A. Schapira

[57] ABSTRACT

An improved paperboard laminate for containers for bulk packaging liquids, syrups and pastes, which includes a layer of a high strength polymer film and which also may include a layer of aluminum foil.

26 Claims, 2 Drawing Figures

PAPER-BOARD LAMINATE

BACKGROUND OF THE INVENTION

This invention relates to coated, paperboard containers and in particular to containers for packaging and storing materials which are prone to leak from the containers or to damage the paperboard by seeping through minor cuts and imperfections in the coating on the paperboard.

Paperboard containers for a great variety of foods and beverages have become widely known and utilized. For example, containers such as those disclosed in U.S. Pat. No. 2,750,095 have been employed for holding perishable foods for relatively short periods of time, on the order of about two weeks. Such containers have found wide applicability for beverages, such as milk and orange juice. Typically, such containers have been assembled from a paperboard blank, coated on both sides with one or more layers of a protective, thermoplastic material, such as polyethylene. Such containers have provided substantial advantages in both economy and convenience for producers as well as consumers.

However, the use of such containers over an extended period of time with certain penetrative fill products has raised certain significant problems. One problem has involved the relative lack of durability of such containers when holding liquids and syrups for longer than a few weeks. The fluid contents of such containers have usually tended to "wick" or seep through damaged areas of or defects in the thermoplastic coating into the paperboard base stock. This seepage of fluid through the inside, thermoplastic coating into the paperboard has tended to weaken the containers and to cause them to ultimately leak or rupture.

It has been found that wicking occurs principally at certain sites, inside the containers. Usually, such sites are where the paperboard material has been scored, folded and/or flexed in forming blanks for containers, folding the blanks along the score lines to form the containers, or in filling, closing or storing the containers. In the case of some diet, soft drink syrups, it has been noted that almost any damage to the coating material on the inside surface of the containers can result in rapid and disastrous penetration of the paperboard base stock by the syrup. Obviously, this problem is particularly aggravated when the containers are stored for a relatively long period of time, since exposure of even small areas of the paperboard base stock, such as may occur through tiny pin holes in the thermoplastic coating, can, over a long period of time, cause the wicking of the fill product into substantial portions of the paperboard base stock and the resulting failure of the containers.

In addition to the problem of the durability of paperboard containers for liquids, another obvious problem has been the relative lack of adequate protection for the quality of the material packaged in such containers over a relatively long period of time. Typically, a substantial loss of quality has been encountered when utilizing conventional paperboard containers for holding liquid materials for more than about two weeks. This has been due primarily to the inadequacy of conventional thermoplastic coating materials as barriers against the loss of aromatic oils and other ingredients vital to the flavor of various substances. Loss of quality has also been attributed to the fact that conventional thermoplastic coatings are relatively inadequate barriers against penetration by gases such as oxygen.

In order to overcome such problems in paperboard containers, coated laminates of paperboard and aluminum foil have been utilized. See, for example, U.S. Pat. No. 3,365,111. The aluminum foil, when bonded to the paperboard, has been found to enhance the durability of the resulting containers by inhibiting the liquid or syrup contents from penetrating the paperboard base stock. More importantly, the aluminum foil has served as an effective barrier against both the inflow and outflow of gases and liquids, thereby minimizing the deterioration of the contents of the containers over prolonged periods.

Aluminum foil-paperboard laminated have not, however, been entirely satisfactory for some fill products. The containers made from such laminates have still been prone to wicking through score cuts, breaks or defects in the thermoplastic material and aluminum foil into the paperboard base stock, particularly over extended periods of time. Although the amount of wicking has been reduced with such laminates, the problem has continued to be a significant one when the containers have been used for some fill products over periods of about 2 months or more.

The problem of seepage through score cuts, breaks or defects in the thermoplastic coating and the aluminum foil has been a particularly serious problem at the corners of paperboard containers. At the corners, the paperboard laminates have been particularly susceptible to the effects of scoring and folding operations to form the containers, as well as the effects of flexing the container during the filling, conveying and packing of the containers. In this regard, it has been found that the aluminum foil is almost invariably crushed or cracked during the scoring and folding of the paperboard blanks, rendering the containers susceptible to the deleterious effects of fluid leakage into the paperboard base stock.

There has been an unfilled need therefore for a paperboard laminate material having improved abuse resistance, particularly resistance to the effects of scoring, folding and flexing, and which also possesses barrier properties for maintaining the quality of the containers' contents over relatively extended periods of time.

SUMMARY OF THE INVENTION

In accordance with this invention, an improved laminate is provided for a container for liquids, syrups and pastes, which comprises a layer of a paperboard base stock, a layer of a thermoplastic material bonded to one surface of the paperboard base stock, a layer of a high strengh polymer film bonded on one of its surfaces to the other surface of the paperboard base stock, and a second layer of a thermoplastic material bonded to the other surface of the polymer film. In accordance with another embodiment of this invention, the improved laminate for a container of this application is provided with a layer of aluminum foil bonded to one of the surfaces of the layer of a polymer film.

By the improved laminate of this application, a material is provided having improved strength, durability, resistance to cuts, cracks and pin holes, as well as improved barrier properties. This laminate is also adapted to be cut and scored on conventional process equipment into blanks for paperboard containers. The laminate is therefore well suited for use in inexpensive, disposable, coated, paperboard containers to substantially reduce the tendency of the containers to fail, due to the wicking of their contents over extended periods of time.

DETAILED DESCRIPTION OF THE INVENTION

Figure 1:
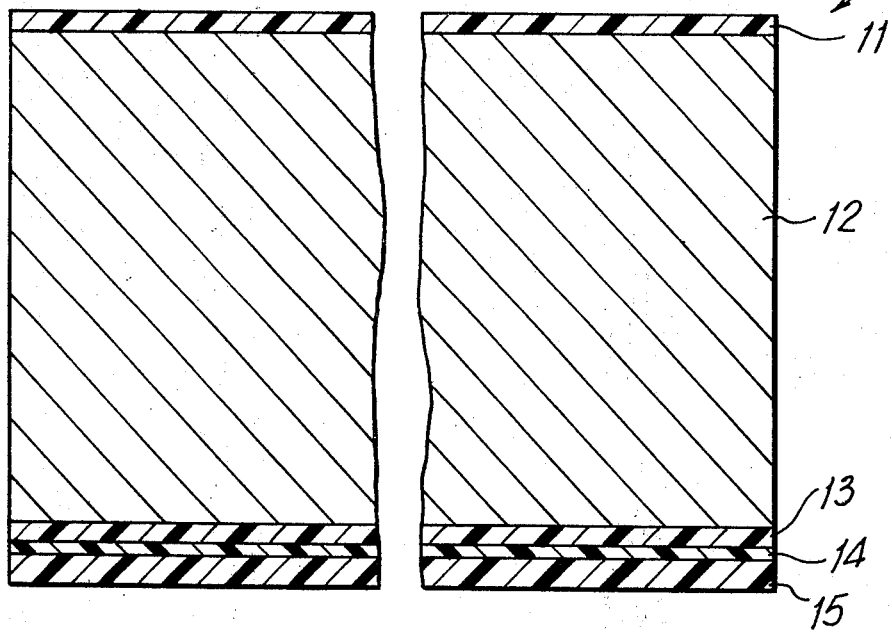
FIG. 1 is a schematic, cross-sectional view of a laminate in accordance with an embodiment of this invention.

Shown in FIG. 1 is a multi-layer laminate 10 which comprises a first layer of a thermoplastic material 11; a layer of a paperboard base stock 12; a laminating layer 13; a layer of a high strength polymer film 14; and a second layer of a thermoplastic material 15. The first thermoplastic layer 11 is bonded to one surface of the paperboard base stock 12, and the laminating layer 13 is bonded to the other surface of the paperboard base stock 12. The laminating layer 13 is also bonded to one surface of the layer of a polymer film 14, and the second thermoplastic layer 15 is bonded to the other surface of the layer of a polymer film 14.

In the laminate of this invention, the first thermoplastic layer 11 and the second thermoplastic layer 15 can be formed from any thermoplastic material conventionally utilized on the inner or outer surfaces of coated, paperboard containers. Among the thermoplastic materials which can be utilized are the polyolefins, such as are disclosed in U.S. Pat. No. 3,423,341, e.g., polyethylene and polypropylene; the ethylene-acrylic acid copolymers, such as are described in U.S. Pat. No. 3,423,231; and the Surlyn ionic copolymers, such as are disclosed in U.S. Pat. No. 3,791,915. The preferred thermoplastic materials for the first and second thermoplastic layers 11 and 15 are the polyolefins, particularly low density polyethylene. In this laminate, the thickness of the first thermoplastic layer 11 and of the second thermoplastic layer 15 is not critical, and any thickness greater than about 0.0005 inches, sufficient to enable a heat-sealed bond to be formed between the two layers, can be suitably utilized. Preferably, the thickness of the first and second thermoplastic layers 11 and 15 is from about 0.0005 inches to about 0.0020 inches. A particularly preferred thickness for the first thermoplastic layer, as an outside coating for a container, is about 0.00075 inches, and a particularly preferred thickness for the second thermoplastic layer, as an inside coating for a container, is about 0.0015 inches.

In this laminate, any conventional, high strength polymer film having a tensile strength at the yield point of greater than about 4,000 p.s.i. and an elongation at fracture of greater than about 200% can be utilized for the polymer film layer 14. Among the materials which can be suitably utilized for forming the polymer film layer 14 are the synthetic linear polyamides, i.e., the nylons, preferably nylon-6, nylon-6,6, nylon-6,10 and copolymers of these nylons. Materials which can also be suitably utilized for forming the polymer film layer 14 are polytetramethylene terephthalate and polycyclohexylenedimethylene terephthalate, available from Eastman Chemical Products Co., Kingsport, Tennessee, under the trade designations PTMT and PCDT, respectively. The preferred materials for the polymer film layer 14 are the nylons, especially the nylons coated on a surface with an additional gas barrier material, such as saran, i.e., polyvinylidene chloride. A particularly preferred nylon is a saran coated nylon 6 film, available under the trade name Capran 70K from Allied Chemical Corporation, Morristown, New Jersey.

The polymer film layer 14 can be treated, if desired, to promote its adhesion to the laminating layer 13 or to the second thermoplastic layer 15. In the laminate 10, the selection of the treatment to promote adhesion and the amount of treatment utilized are not critical. When the polymer film layer 14 is a nylon film, adhesion can be promoted by applying to a surface of the film an adhesion primer, such as the polyalkylene imines or the urethane based materials disclosed in U.S. Pat. No. 3,570,748, in an amount sufficient to assure that the nylon film layer is bonded to the second thermoplastic layer 15 or to the laminating layer 13. A preferred method of promoting adhesion of a nylon film layer 14 is by electrostatically treating one or both surfaces thereof.

In the laminate 10, when the laminating layer 13 or the second thermoplastic layer 15 or both are polyolefins, a nylon film layer 14 is preferably treated to promote adhesion. It is particularly preferred that a barrier coated nylon film layer 14 be electrostatically treated on its uncoated surface and that it be treated with an adhesion primer on its coated surface to assure adhesion of both surfaces to the polyolefin laminating layer 13 and the polyolefin second thermoplastic layer 15. A suitable adhesion primer for bonding the coated surface of the nylon film layer 14 to the polyolefin second thermoplastic layer 15 or to the polyolefin laminating layer 13 is an ethylene-acrylic acid copolymer, such as is available under the trade name Adcote 50 C12 from Morton Chemical Company of Chicago, Illinois. This adhesion primer is preferably applied to the nylon film layer 14 in an amount of at least ¼ pound, preferably ½ to 1 pound, per 3,000 sq. ft. of paperboard base stock 12.

In the laminate of this application, the thickness of the layer of the high strength polymer film 14 is not critical, and any thickness between about 0.0003 inches and 0.0015 inches can be suitably utilized. Preferably, the polymer film layer 14 is a nylon having a thickness of about 0.0004 to about 0.0010 inches, particularly about 0.0006 inches.

In the laminate 10, any paperboard base stock conventionally utilized in coated, paperboard containers can be utilized in the paperboard base stock layer 12. Preferably, the paperboard base stock has a basis weight of from about 150 pounds to about 400 pounds per 3,000 sq. ft. and a thickness of about 0.010 inches to about 0.030 inches. In a laminate intended for use in a one gallon size container, it is especially preferred that a paperboard base stock of about 300 to 335 pounds per 3,000 sq. ft. and of about 0.024 to about 0.028 inches thickness be utilized, particularly a paperboard base stock having a weight of about 327 pounds per 3,000 sq. ft. and a thickness of about 0.026 inches. However, for laminates intended for containers larger or smaller than a 1 gallon size, paperboard base stocks of greater or lesser weights and thicknesses than the foregoing are especially preferred. For example, in a laminate for a quart size container, a paperboard base stock of about 180 to 250 pounds per 3000 sq. ft. and of about 0.013 to about 0.019 inches thickness is especially preferred.

In this laminate, the laminating layer 13 can be any conventional material for bonding a layer of a polymer film to a layer of paperboard. Among the preferred materials for the laminating layer 13 are the thermoplastic materials, such as the thermoplastic materials described above for the first and second thermoplastic layers 11 and 15, especially the polyolefins, particularly low density polyethylene. However, if desired, other adhesive materials, such as the two component laminating adhesive available under the tradename Adcote 503 from Morton Chemical Co., Chicago, Illinois, can be utilized in the layer 13 for laminating the polymer film layer 14 to the paperboard layer 12. The thickness of the laminating layer 13 is not critical, but rather will depend upon the type of material used in the laminating layer. With the especially preferred polyolefins, any thickness from about 0.0003 inches to about 0.0020 inches can be suitably utilized, with about 0.0010 inches being preferred. Alternatively, if desired, the laminating layer 13 can be dispensed with entirely by extruding or otherwise applying the polymer film layer 14 directly on to the surface of the paperboard base stock 12.

As seen from the above description, all of the layers of the multi-layer laminate 10, when considered individually, are well known materials. However, in combination, the layer of paperboard base stock 12, the polymer film layer 14 and the first and second thermoplastic layers 11 and 15 combine to provide a laminate having superior strength and durability, resistance to cuts, cracks and the formation of pin holes, as well as improved barrier properties, but which is nevertheless suitable for cutting and scoring into container blanks on conventional process equipment. Because of its improved properties, the laminate 10 is well suited for use in containers for holding and storing liquids, syrups and pastes of various comestibles, such as milk, soft drink concentrates, juices, juice concentrates and mustard, over extended periods of time.

Figure 2:
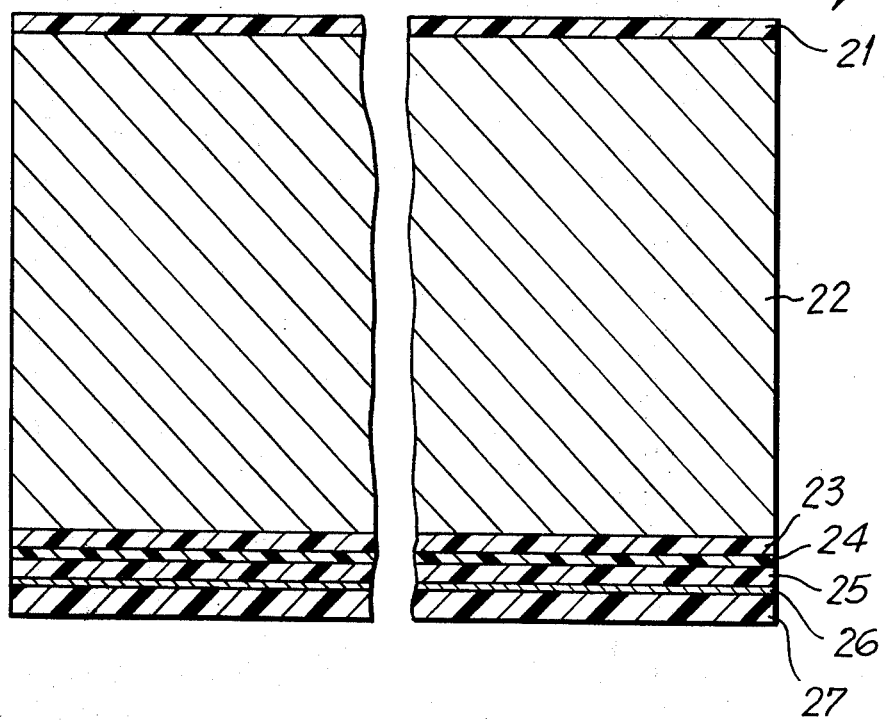
FIG. 2 is a schematic, cross-sectional view of a second embodiment of a laminate in accordance with this invention, which includes an aluminum foil layer.

Shown in FIG. 2 is a second embodiment of this invention. The multi-layer laminate 20 in FIG. 2 comprises: a first layer of a thermoplastic material 21; a layer of a paperboard base stock 22; a first laminating layer 23; a layer of a high strength polymer film 24; a second laminating layer 25; a layer of aluminum foil 26; and a second layer of a thermoplastic material 27. The first thermoplastic layer 21 is bonded to one surface of the paperboard base stock 22, and the first laminating layer 23 is bonded to the other surface of the paperboard base stock 22. The first and second laminating layers 23 and 25 are bonded to the surfaces of the polymer film layer 24. The second laminating layer 25 and the second thermoplastic layer 27 are bonded to the surfaces of the aluminum foil 26.

In the laminate 20, in accordance with the second embodiment of this invention, the first thermoplastic layer 21 and the second thermoplastic layer 27 can be formed from any thermoplastic material conventionally utilized for coating the inside or the outside surfaces of paperboard containers. The first and second thermoplastic layers 21 and 27 are preferably the same as the first and second thermoplastic layers 11 and 15 in the multi-layer laminate 10, described above.

The layer of paperboard base stock 22 in the laminate 20 can be any paperboard base stock conventionally utilized in coated paperboard containers. Preferably, the paperboard base stock 22 in the multi-layer laminate 20 is the same as the paperboard base stock 12 in the multi-layer laminate 10, described above.

The layer of a high strength polymer film 24 in the laminate 20 can be any conventional polymer film having a tensile strength at the yield point of greater than about 4000 p.s.i. and an elongation at fracture of greater than about 200%, such as the high strength polymer films described above for the layer 14 of the laminate 10. The preferred polymer films for the layer 24 are the nylon films described above in connection with the polymer film layer 14 in the laminate 10.

In the laminate 20, the first laminating layer 23 can be any conventional adhesive material adapted to bond the layer of a polymer film 24 to the layer of the paperboard base stock 22, and the second laminating layer 25 can be any conventional adhesive material adapted to bond the layer of aluminum foil 26 to the polymer film layer 24. Preferably, the first laminating layer 23 is the same material as the laminating layer 13 in the laminate 10, described above, especially the polyolefins, particularly polyethylene. The second laminating layer 25 is also preferably the same material as the laminating layer 13 in the laminate 10, especially a polyolefin, particularly polyethylene. Alternatively, if desired, either one or both of the first and second laminating layers may be eliminated entirely by extruding or otherwise applying the polymer film layer 24 directly on to a surface of one or both of the paperboard base stock 22 and aluminum foil 26.

The layer of aluminum foil 26 in the multi-layer laminate 20 can be of any thickness conventionally utilized in paperboard containers, such as are described in U.S. Pat. No. 3,365,111. Preferably, the aluminum foil has a thickness of from about 0.00025 to about 0.001 inches, especially a thickness of about 0.00035 inches.

As seen from the above, all of the layers of the laminate 20 of the second embodiment of this invention, considered individually, are conventional materials. However, in combination, the layer of paperboard base stock 22, the layer of a high strength polymer film 24, the layer of the aluminum foil 26 and the first and second layers of thermoplastic materials 21 and 27 provide a laminate material 20 having superior strength and durability, resistance to cuts, cracks and pin holes, as well as superior barrier properties with regard to penetration by liquids and gases, but which is nevertheless suitable for cutting and scoring into container blanks on conventional process equipment. Because of its superior properties, the laminate 20 is very well suited for use in containers for holding and storing liquids, syrups and pastes of various comestibles, such as juices, soft drink syrups, particularly diet soft drink syrups, juice concentrates and the like.

In the laminates of this invention, it is considered that the particular arrangement and number of layers described above are preferred but not critical and that different arrangements and additional layers may be suitably utilized, depending on the purpose for which the laminate is to be employed. For example, it is preferred that the layer of a polymer film 14 be positioned interiorly of the layer of the paperboard base stock 12 in a container made of laminate 10. However, if desired, the polymer film layer 14 can also be located exteriorly of the paperboard stock 12 or, alternatively, polymer film layers can be provided both interiorly and exteriorly of the paperboard base stock in a container. Likewise, in the laminate 20, it is preferred that the layer of aluminum foil 26 be located interiorly of the layer of a polymer film 24 and that both the polymer film layer and the aluminum foil layer be located interiorly of the layer of paperboard base stock 22 in a container. However, if desired, either the polymer film layer 24 or the layer of aluminum foil 26 or both may be located exteriorly of the layer of paperboard base stock 22 or layers of a polymer film and aluminum foil may be located both interiorly and exteriorly of the layer of paperboard base stock in a container constructed from the laminate 20.

It is also considered that the invention and many of its attendant advantages will be obvious from the foregoing description and that it will be likewise apparent that various changes may be made in the form, construction and arrangement of the parts without departing from the spirit and scope of the invention or sacrificing all of its material advantages, the form hereinbefore described being merely preferred embodiments thereof.

We claim:
1. A laminate comprising:
   a layer of a paperboard base stock;
   a first layer of a thermoplastic material having a thickness of greater than about 0.0005 inches bonded to said layer of paperboard base stock;
   a layer of a polymer film having a thickness of between about 0.0003 inches and 0.0015 inches bonded to said layer of paperboard base stock, said polymer film having a tensile strength at the yield point greater than about 4000 p.s.i. and an elongation at fracture greater than about 200%; and
   a second layer of a thermoplastic material having a thickness of greater than about 0.0005 inches bonded to said layer of a polymer film.
2. The laminate of claim 1 wherein said polymer film is a nylon film.
3. The laminate of claim 2 wherein said first and second layers of a thermoplastic material have a thickness of from about 0.0005 to about 0.0020 inches; said nylon film has a thickness of about 0.0004 to about 0.0010 inches; and said paperboard base stock has a thickness of about 0.010 to about 0.030 inches and a basis weight of about 150 to about 400 pounds/3000 sq. ft.
4. The laminate of claim 3 wherein said layer of a nylon film is bonded to said layer of a paperboard base stock with a laminating layer of a thermoplastic material.
5. The laminate of claim 4 wherein said laminating layer comprises a polyolefin having a thickness of about 0.0003 to about 0.002 inches.
6. The laminate of claim 5 wherein said nylon film is coated on one surface with saran and electrostatically treated on the other surface to promote adhesion of said other surface of said nylon film to a polyolefin layer.
7. The laminate of claim 6 wherein said saran coated surface of said nylon is treated with an ethylene-acrylic acid copolymer to promote adhesion of said surface to a surface of a polyolefin layer.
8. The laminate of claim 1 wherein said laminate includes a layer of aluminum foil.
9. The laminate of claim 3 wherein said laminate includes a layer of aluminum foil having a thickness of about 0.00025 inches to about 0.001 inches between said layer of a nylon film and said second layer of a thermoplastic material.
10. The laminate of claim 9 wherein said layer of aluminum foil is bonded to said nylon film with a laminating layer of a thermoplastic material.
11. The laminate of claim 10 wherein said laminating layer comprises a polyolefin having a thickness of about 0.0003 to 0.0020 inches.
12. The laminate of claim 3 wherein said first layer and said second layer of thermoplastic material are polyethylene.
13. The laminate of claim 9 wherein said first layer and said second layer of thermoplastic material are polyethylene.
14. The laminate of claim 2 wherein said nylon film is a polycaprolactam coated on a surface with polyvinyl chloride.
15. The laminate of claim 2, for a container, which comprises:
   a first layer of polyethylene having a thickness of about 0.00075 inches;
   a layer of paperboard base stock of about 0.010 to about 0.030 inches thickness and a basis weight of about 150 to about 400 pounds/3000 sq. ft., bonded to said first layer;
   a laminating layer of polyethylene, bonded to said layer of paperboard base stock, having a thickness of about 0.0010 inches;
   a layer of a nylon film, having a thickness of about 0.0006 inches, bonded to said laminating layer; and
   a second layer of polyethylene, bonded to said nylon film and having a thickness of about 0.0015 inches.
16. The laminate of claim 15 wherein said laminate is for a one gallon size container and said paperboard base stock has a thickness of about 0.024 to about 0.028 inches and a basis weight of about 300 to about 335 pounds/3000 sq. ft.
17. The laminate of claim 16 wherein said paperboard base stock has a thickness of about 0.026 inches and a basis weight of about 327 pounds/3000 sq. ft.
18. The laminate of claim 9, for a container, which comprises:
   a first layer of polyethylene having a thickness of about 0.00075 inches;
   a layer of a paperboard base stock of about 0.010 to about 0.030 inches thickness and a basis weight of about 150 to about 400 pounds/3000 sq. ft., bonded to said first layer;
   a first laminating layer of polyethylene, bonded to said layer of paperboard base stock, having a thickness of about 0.0010 inches;
   a layer of a nylon film, having a thickness of about 0.0006 inches, bonded to said laminating layer;
   a second laminating layer of polyethylene, bonded to said nylon film and having a thickness of about 0.0010 inches;
   a layer of aluminum foil having a thickness of about 0.00035 inches bonded to said second laminating layer; and
   a second layer of polyethylene, bonded to said aluminum foil, having a thickness of about 0.0015 inches.
19. The laminate of claim 18 wherein said laminate is for a one gallon size container and said paperboard base stock has a thickness of about 0.024 to about 0.028 inches and a base weight of about 300 to 335 pounds/3000 sq. ft.
20. The laminate of claim 19 wherein said paperboard has a thickness of about 0.026 inches and a basis weight of about 327 pounds/3000 sq. ft.

21. In a thermoplastic-coated, paperboard container, suitable for liquids, pastes and syrups, an improved paperboard laminate material which comprises:
- a first layer of a thermoplastic material having a thickness of greater than about 0.0005 inches;
- a layer of a paperboard base stock, bonded to said first thermoplastic layer;
- a layer of a polymer film having a thickness of between about 0.0003 inches and 0.0015 inches bonded to said layer of a paperboard base stock, said polymer film having a tensile strength at the yield point greater than about 4000 p.s.i. and an elongation at fracture greater than about 200%; and
- a second layer of a thermoplastic material, having a thickness of greater than about 0.0005 inches bonded to said layer of a polymer film.

22. The container of claim 21 wherein said polymer film is a nylon film.

23. The container of claim 22 wherein said first and said second layers of thermoplastic material have a thickness of about 0.0005 to about 0.0020 inches; said nylon film has a thickness of about 0.0004 to about 0.0010 inches; and said paperboard base stock has a thickness of about 0.010 to about 0.030 inches and a basis weight of about 150 to about 400 pounds/3000 sq. ft.

24. The container of claim 21 wherein said improved paperboard laminate material includes a layer of aluminum foil.

25. The container of claim 23 wherein said improved paperboard laminate includes a layer of aluminum foil, having a thickness of about 0.00025 to about 0.001 inches, between said layer of a nylon film and said second layer of a thermoplastic material.

26. The container of claim 22 wherein said nylon film is a polycaprolactam coated on a surface with polyvinyl chloride.

* * * * *

UNITED STATES PATENT OFFICE
CERTIFICATE OF CORRECTION

PATENT NO. : 3,972,467
DATED : August 3, 1976
INVENTOR(S) : Allan A. Whillock et al It is certified that error appears in the above-identified patent and that said Letters Patent are hereby corrected as shown below:

Column 2, line 15, "laminated" should be -- laminates -- ;

Column 6, line 64, after "paperboard," should be inserted -- base -- ;

Column 8, line 14, "polyvinyl" should be -- polyvinylidene -- ; and

Column 10, line 18, "polyvinyl" should be -- polyvinylidene -- .

Signed and Sealed this

Second Day of November 1976

[SEAL]

Attest:

RUTH C. MASON
Attesting Officer

C. MARSHALL DANN
Commissioner of Patents and Trademarks